(12) United States Patent
Dell et al.

(10) Patent No.: US 7,207,910 B2
(45) Date of Patent: Apr. 24, 2007

(54) ISOLATOR FOR ALTERNATOR PULLEY

(75) Inventors: James W. Dell, Aurora (CA); Bert Mevissen, Nobleton (CA)

(73) Assignee: Litens Automotive, Woodbridge, Ontario (CA)

( * ) Notice: Subject to any disclaimer, the term of this patent is extended or adjusted under 35 U.S.C. 154(b) by 0 days.

(21) Appl. No.: 11/495,410

(22) Filed: Jul. 27, 2006

(65) Prior Publication Data

US 2006/0264280 A1 Nov. 23, 2006

Related U.S. Application Data

(63) Continuation of application No. 10/418,534, filed on Apr. 18, 2003.

(60) Provisional application No. 60/373,327, filed on Apr. 18, 2002.

(51) Int. Cl.
*F16H 61/14* (2006.01)
(52) U.S. Cl. ...................................... 474/74
(58) Field of Classification Search ................ 474/69, 474/70, 74; 192/41 S, 107 T, 76
See application file for complete search history.

(56) References Cited

U.S. PATENT DOCUMENTS

| 4,460,076 A | * | 7/1984 | Yamada | 192/35 |
|---|---|---|---|---|
| 5,139,463 A | | 8/1992 | Bytzek et al. | |
| 5,156,573 A | * | 10/1992 | Bytzek et al. | 474/74 |
| 6,083,130 A | * | 7/2000 | Mevissen et al. | 474/70 |
| 6,761,656 B2 | * | 7/2004 | King et al. | 474/74 |
| 6,923,303 B2 | * | 8/2005 | Liston et al. | 192/41 S |
| 7,052,420 B2 | * | 5/2006 | King et al. | 474/74 |
| 2004/0014540 A1 | * | 1/2004 | Dell et al. | 474/70 |

FOREIGN PATENT DOCUMENTS

WO    WO 2004011818 A1 *  2/2004

* cited by examiner

*Primary Examiner*—Vicky A. Johnson
(74) *Attorney, Agent, or Firm*—Clark Hill PLC

(57) ABSTRACT

A decoupler for an alternator pulley in a serpentine drive system has a resilient, helical spring member that couples the alternator pulley with a hub structure through a spring retaining member. A bushing is disposed between the spring retaining member and the hub structure to facilitate sliding engagement therebetween. An annular sleeve member is disposed between the spring member and the alternator pulley to facilitate sliding engagement therebetween. The spring member is connected at one end thereof to the hub structure and connected at an opposite end thereof to the spring retaining member. The resilient spring member transmits the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement.

5 Claims, 5 Drawing Sheets

ISOLATOR FOR ALTERNATOR PULLEY

RELATED APPLICATION

This application is a continuation of U.S. application Ser. No. 10/418,534, filed Apr. 18, 2003, which priority to and all the benefits of U.S. Provisional Application No. 60/373,327, filed on Apr. 18, 2002.

BACKGROUND OF THE INVENTION

1. Field of the Invention

The present invention relates to a decoupler and more particularly to an alternator decoupler for a serpentine accessory drive systems for automotive vehicles.

2. Description of Related Art

Serpentine accessory drive systems typically includes a driving pulley on the output shaft of the internal combustion engine of the vehicle, a series of driven pulleys for the accessories and a poly-V belt trained about the driving and driven pulleys. An advantage of the serpentine drive is that, by providing an automatic belt tensioner on the belt, the accessories can be fixedly mounted.

Particularly where the engine is of the four-cylinder type, the driving pulley establishes a highly dynamic loading on the belt. This high dynamic loading is due to the variable torque output characteristics of such engines. Under this circumstance, the tensioner cannot accommodate all of the variable torque characteristics. The result is sometimes noise and decreased belt life due to instantaneous belt slippage. It has been proposed to provide an engine crank shaft decoupler in order to deal with the high dynamic belt loading. This solution, while effective, is costly since the decoupler must have a capacity generally equal to the system capacity.

It has also been proposed in U.S. Pat. No. 5,139,463 of common ownership with the present invention and which is hereby incorporated by reference in its entirety for its teachings as they relate to the present invention, to provide an alternator assembly wherein a coil spring is provided between an alternator pulley and alternator hub structure for transmitting the driven rotational movements of the alternator pulley by the serpentine belt to the hub structure such that the alternator armature assembly is rotated in the same direction as the alternator pulley while being capable of instantaneous relative resilient rotational movements in opposite directions with respect to the alternator pulley during the driven rotational movement thereof. This has proven to be a cost effective manner of accommodating high dynamic belt loading to reduce noise and preserve belt life. Nevertheless, it can be appreciated that the coil spring employed is subject to significant stresses over the life of the alternator. It is therefore an object of the present invention to reduce stress on the spring and thereby increase the life thereof.

SUMMARY OF THE INVENTION

The above and related objects of this invention are realized by providing a serpentine belt drive system for an automotive vehicle comprising a drive assembly including an internal combustion engine having an output shaft with a driving pulley thereon rotatable about a driving pulley axis, a sequence of driven assemblies each having a driven pulley rotatable about an axis parallel with said driving pulley axis and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley. The drive system further includes a sequence of driven assemblies including an alternator assembly including a housing and an armature assembly mounted in the housing for rotation about an armature axis. A hub structure is fixedly carried by the armature assembly outwardly of the housing for rotation therewith about the armature axis. An alternator pulley is mounted on the hub structure for rotational movement about the armature axis. A coil spring resiliently couples the alternator pulley with the hub structure, the coil spring transmitting the driven rotational movements of the alternator pulley by the serpentine belt to the hub structure such that the armature assembly is rotated in the same direction as the alternator pulley while being capable of instantaneous relative rotational movements in opposite direction with respect to the alternator pulley during the driven rotational movements thereof. An inner spring engaging structure is rotationally fixed with respect to the pulley and engages volutes of the coil spring as a result of radial contraction of the coil spring.

Other aspects of the invention are achieved as follows:

A serpentine belt drive system for an automotive vehicle comprising a drive assembly including an internal combustion engine having an output shaft with a driving pulley thereon rotatable about a driving pulley axis, a sequence of driven assemblies each having a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause the driven pulleys to rotate in response to the rotation of the driving pulley, the sequence of driven assemblies including an alternator assembly including a housing and an armature assembly mounted in the housing for rotation about an armature axis; a hub structure fixedly carried by the armature assembly outwardly of the housing for rotation therewith about the armature axis, an alternator pulley is mounted on the hub structure for rotational movement with respect to the hub structure about the armature axis; an outer spring engaging structure disposed between the alternator pulley and the coil spring, the outer spring engaging structure engaging volutes of the coil spring as a result of radial expansion of the coil spring; and a coil spring resiliently coupling the alternator pulley with the hub structure, the coil spring transmitting the driven rotational movements of the alternator pulley by the serpentine belt to the hub structures such that the armature assembly is rotated in the same direction as the alternator pulley while being capable of instantaneous relative rotational movements in opposite directions with respect to the alternator pulley during the driven rotational movement thereof, an outer spring engaging structure disposed between the alternator pulley and the coil spring, the outer spring engaging structure engaging volutes of the coil spring as a result of radial expansion of the coil spring.

A serpentine belt drive system for an automotive vehicle comprising a drive assembly including an internal combustion engine having an output shaft with a driving pulley thereon rotatable about a driving pulley axis, a sequence of driven assemblies each having a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause the driven pulleys to rotate in response to the rotation of the driving pulley, the sequence of driven assemblies including an alternator assembly including a housing and an armature assembly mounted in the housing for rotation about an armature axis; a hub structure fixedly carried by the armature assembly outwardly of the housing for rotation therewith about the armature axis, an alternator pulley mounted on the hub structure for rotational movement about the armature axis; a coil spring resiliently coupling the alternator pulley with the hub structure, the coil spring transmitting the driven rotational movements of the alternator pulley by the serpentine belt to the hub structure such that the armature assembly is rotated in the same direction as the alternator pulley while being capable of instantaneous relative rotational movements in opposite directions with respect to the alternator pulley during the driven rotational movement thereof, the alternator pulley being mounted for axial movement relative to the hub, the coil spring axially expanding during radial contraction thereof and thereby applying an increasing axial damping force on the pulley so as to dampen rotational movement of the pulley relative to the hub structure.

A decoupler has a hub structure capable of being mounted on a shaft; a pulley mounted on the hub structure and capable of relative rotational movement with respect to the hub structure; a coil spring resiliently coupling the pulley with the hub structure, the coil spring capable of transmitting driven rotational movements of the pulley to the hub structure; an inner spring engaging structure rotationally fixed with respect to the pulley and engaging volutes of the coil spring as a result of radial contraction of the coil spring.

A decoupler has a hub structure capable of being mounted on a shaft; a pulley mounted on the hub structure and capable of relative rotational movement with respect to the hub structure; a coil spring resiliently coupling the pulley with the hub structure, the coil spring capable of transmitting driven rotational movements of the pulley to the hub structure; an outer spring engaging structure disposed between the alternator pulley and the coil spring, the outer spring engaging structure engaging volutes of the coil spring as a result of radial expansion of the coil spring.

A decoupler has a hub structure capable of being mounted on a shaft; a pulley mounted on the hub structure and capable of relative rotational movement with respect to the hub structure; a coil spring resiliently coupling the pulley with the hub structure, the coil spring capable of transmitting driven rotational movements of the pulley to the hub structure; the pulley being mounted for axial movement relative to the hub structure; and the coil spring axially expanding during radial contraction thereof and thereby applying an increasing axial damping force on the pulley so as to dampen rotational movement of the pulley relative to the hub structure.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Figure 1:
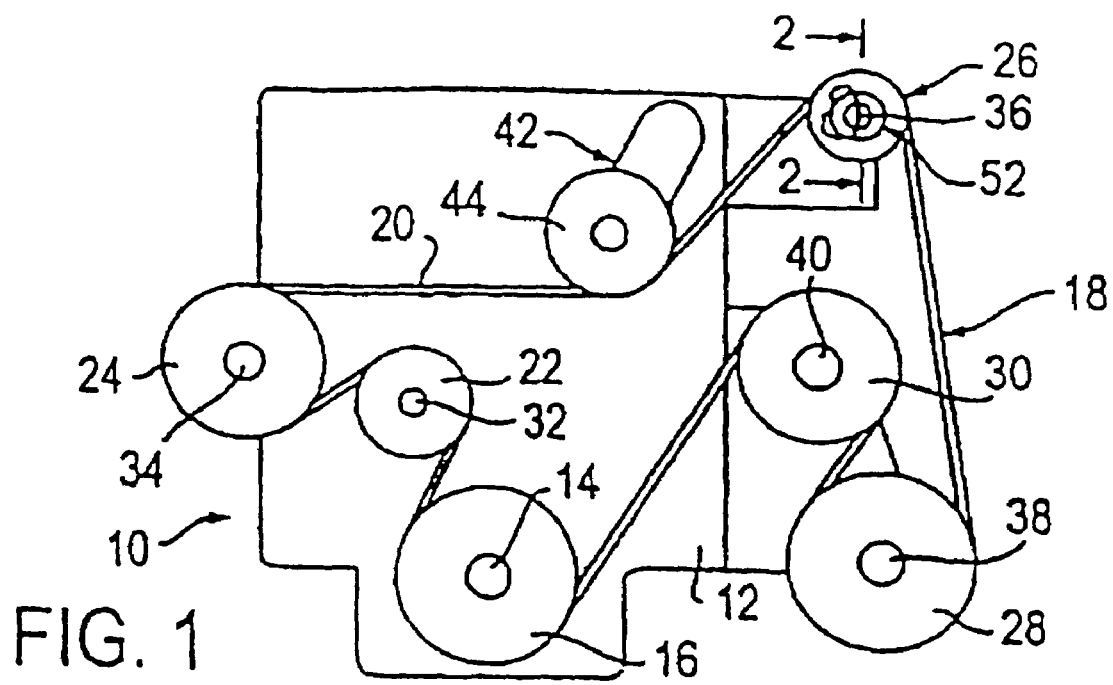
FIG. 1 is a front elevational view of an automobile internal combustion engine having a serpentine drive system embodying the principles of the present invention connected therewith.

Referring now more particularly to the drawings, there is shown in FIG. 1 an automotive internal combustion engine, generally indicated at 10, which includes a schematically indicated engine frame 12 and an output shaft 14. Fixed to the output shaft 14 is a driving pulley 16 forming part of a serpentine drive system, generally indicated at 18. The drive system 18 includes an endless belt 20. The belt 20 is of the thin flexible type, as, for example, a poly-V belt. The belt 20 is trained about the driving pulley 16 and a sequence of driven pulley assemblies 22, 24, 26, 28, and 30, each of which is fixed to a respective shaft 32, 34, 36, 38, and 40. Except for the pulley assembly 22, which is a simple idler pulley, the shafts are connected to operate various engine or vehicle accessories. For example, shaft 34 drives an engine water pump, shaft 36 an electrical alternator, shaft 38 an electromagnetic clutch of a compressor for an air-conditioning system for the automobile, and shaft 40 an oil pump of the power steering system.

It will be understood that the internal combustion engine 10 may be of any known construction. In accordance with conventional practice, the operation of the engine is such as to impart vibratory forces to the engine frame 12. All of the accessories are mounted on the engine frame 12 so that the shafts are rotated about parallel axes which are fixed with respect to the engine frame 12 and parallel with the output shaft 14 thereof. The belt 20 is tensioned by a belt tensioner, generally indicated at 42 which may be of any construction. However, a preferred embodiment is the tensioner disclosed in commonly assigned U.S. Pat. No. 4,473,362, the disclosure of which is hereby incorporated by reference into the present specification.

As shown, the belt tensioner 42 includes an idler pulley 44 which is disposed in rolling engagement with the flat back surface of the belt 20, the tensioner pulley being spring biased to maintain a generally constant tension in the belt 20.

Figure 2:
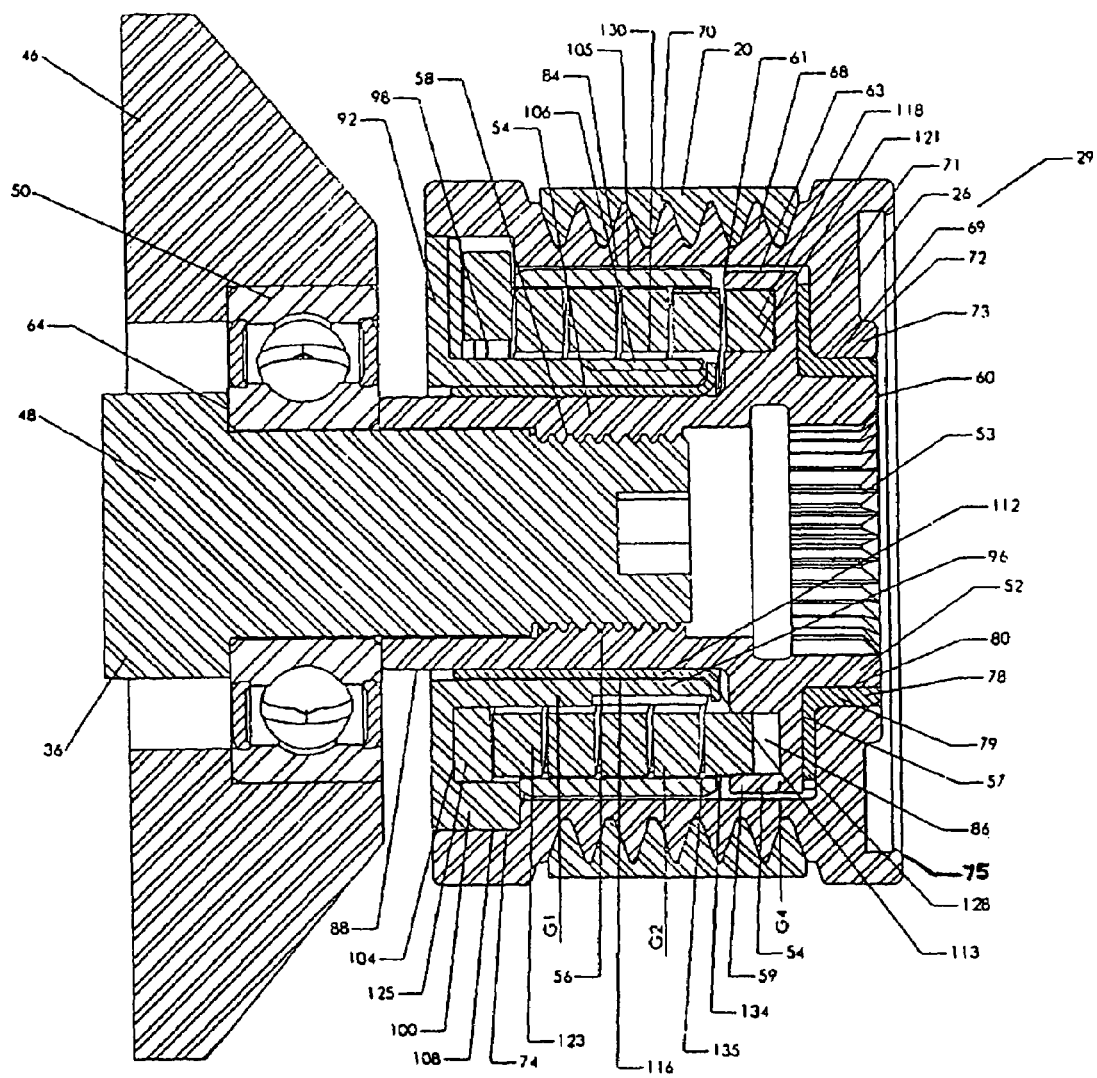
FIG. 2 is an enlarged fragmentary sectional view of the first embodiment of the isolator device taken along the line 2—2 of FIG. 1.

As best shown in FIG. 2, the present invention is more particularly concerned with the functional connection between the pulley, generally indicated at 26, and the shaft 36 of the alternator. The alternator includes a housing 46 within which the armature assembly, generally indicated at 48, is journalled, as by bearings 50. As shown, alternator shaft 36 forms a part of the armature assembly 48 and includes an end portion extending outwardly of the alternator housing 46.

The pulley 26 forms part of a coupling assembly 29, which is mounted on the shaft 36, for coupling the belt 20 to the shaft 36. Coupling assembly 29 also includes, among other elements, the hub structure, generally indicated at 52, which is fixed to the outwardly extending end of the alternator shaft 36. As shown, the hub structure 52 includes an inner sleeve portion 54 which, in the illustrated embodiment, extends over the end of the alternator shaft 36 end portion.

In other embodiments, depending on the alternator and pulley geometry, the inner sleeve portion 54 may not extend over the end of the alternator shaft 36 end portion. As shown, the extremity of the shaft 36 is threaded as indicated at 56 and the sleeve 54 is formed with a series of interior threads 58 which are disposed in meshing relation with the threads on the end of the shaft 36. The inner surface 53 of the hub structure 52 at the outer axial end 60 thereof may be formed of a inner toothed sprocket for receiving a correspondingly configured tool to rotate the hub 52 onto the shaft for threadedly securing the hub structure 52 on the shaft 36. Alternatively, the annular end surface 60 may be formed to provide a hexagonal socket for receiving a tool for securing the sleeve 54 over the shaft 36 by relative rotation between the sleeve 54 and shaft 36, as known in the art. It can be seen that as the sleeve portion 54 is threaded on the end of the shaft 36, the axially inner end surface thereof is squeezed one side of the inner race of the ball bearing 50 against a flange 64 on the shaft 36 and the other side of the inner race of the ball bearing 50 with the inner race of a ball bearing 50 mounted on the shaft 36 in abutting relation with the ball bearing 50.

Figure 3:
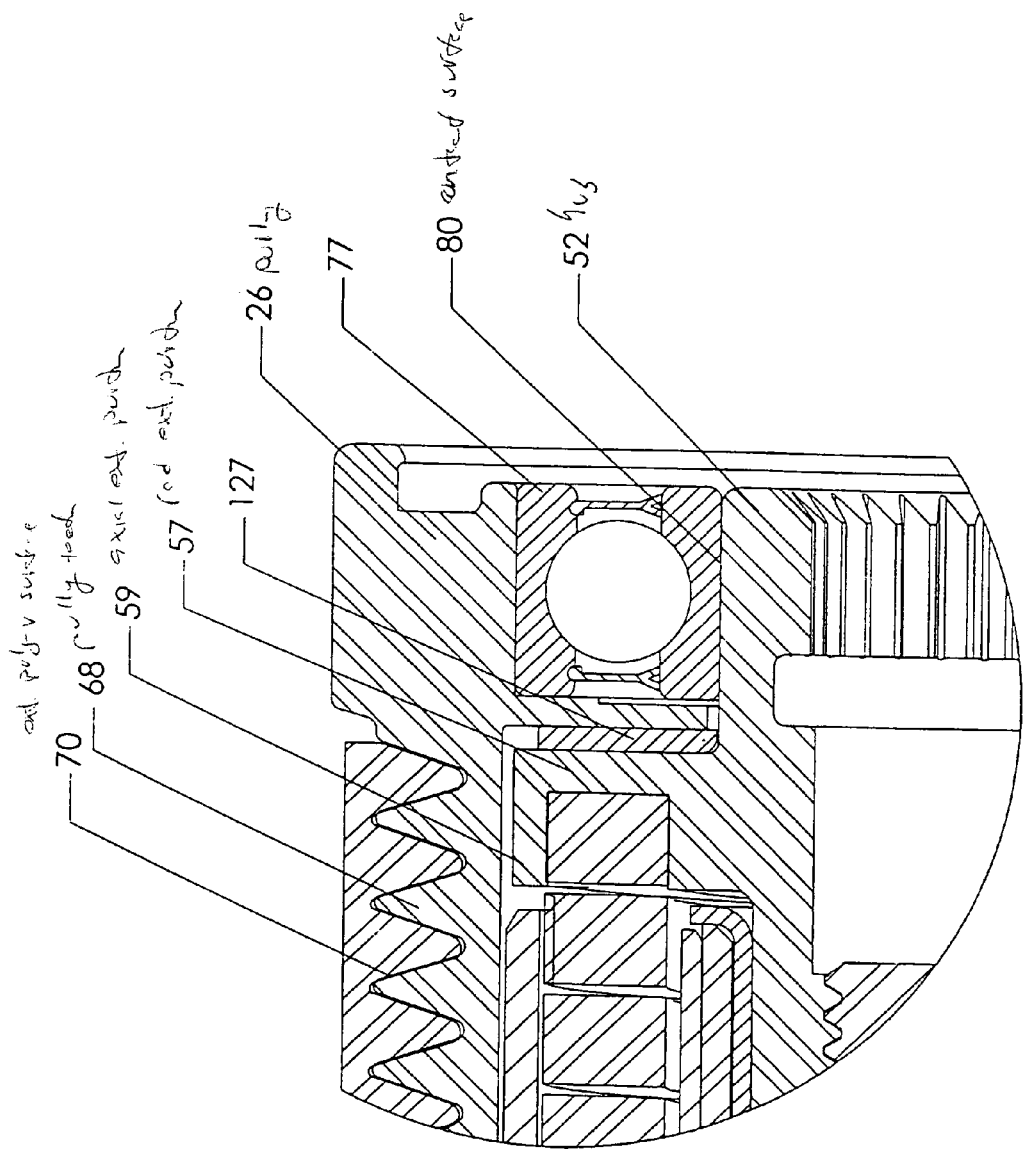
FIG. 3 is an enlarged fragmentary sectional view of an alternate embodiment of a mounting arrangement of the alternator pulley to the hub structure.

As best shown in FIG. 2, the alternator pulley 26 includes an annular pulley member 68 having an exterior poly-V surface 70 for rollingly engaging the operative poly-V side of the serpentine belt 20. One end of the annular pulley member 68 has axial flange 72, which includes a radially inwardly extending portion 71 and then an axially extending portion 73 as shown. Flange 72 may also include a radially outwardly extending end portion 75 as shown. The inner surface 69 of the flange 72 is disposed in engagement with an L-shaped, annular bushing or bearing 78. The annular bushing 78 is preferably an integral structure having an axial extending portion 79 having a radially outer surface disposed in engagement with an portion 73 of flange 72, and a radially inner surface disposed in engagement with a contact surface 80 at the end of the hub structure 52. The annular bushing 78 preferably also includes a radial extending portion 128 having an axially outer surface disposed in engagement with radially inwardly extending portion 71 of the flange portion 72, and an axially inner surface thereof disposed in engagement with a radially outwardly extending portion 57 of hub structure 52 as described below. Although the annular bushing 78 is shown as an integral structure, the annular bushing may also include separate structures: an axial portion, corresponding to axial portion 79, and a radial portion, corresponding to radial portion 128. The annular bushing 78 supports relative motion between the pulley 26 and the shaft 36. The annular bushing 78 may be made of a material having a low coefficient of friction to facilitate sliding action between the pulley 26 and the hub 52. For example, the annular bushing 78 may be a polymeric material. The material of the annular bushing 78 may also a metal, such as brass, or a lead-alloy. A lubricant may also be used at the interface between the annular bushing 78 and pulley 26 to facilitate sliding contact therebetween. The bushing 78 may be fixed relative to one of the hub 52 or pulley 26, or may be movable (slidable) with respect to both. Alternatively, as shown in FIG. 3, rather than using annular bushing 78, a ball bearing 77 may be disposed between the flange portion 72 and the contact surface 80 of the hub structure 52 to support the relative motion between the pulley 26 and the hub 52. In such a configuration, a thrust washer 127 is utilized in place of the radial portion 128 of the annular bushing 78 between the radially inwardly extending portion 71 of the pulley and the protruding portion 57 of the hub 52.

The hub structure 52 includes the forementioned radially protruding portion 57 (hereinafter referred to as the radial portion 57) and an axially inwardly extending portion 59 integrally formed thereon. In the illustrated embodiment, the portion 59 extends axially from the end of the radial portion 57 toward the alternator assembly 46. Alternatively, the orientation of the portion 59 and radial portion 57 may be reversed to permit the poly-V surface 70 of the annular pulley member 68 to be located closer to or further away from the alternator housing. A clearance gap G4 is maintained between the inner surface 84 of the pulley 26 and the outer surface 63 of the axial portion 59 of the hub structure 52 so that the pulley rotates freely thereabout. It can be seen that the mounting of the pulley 26 with respect to the hub structure 52 is such as to define an annular space 86 therebetween, generally defined by the pulley 26, the sleeve portion 54 and radial 57 portion of the hub structure. Disposed within this annular space 86, between an inner surface 84 of the pulley 26 and the outer surface 88 of the hub structure 52, is a spring retaining member made of low carbon steel, generally indicated at 92. The spring retaining member 92 (hereinafter referred to as the spring retainer 92) is formed of an annular cylindrical inner portion 96 and an annular cylindrical outer portion 100 connected by a radial wall portion 104. An exterior cylindrical surface 108 of the outer portion 100 frictionally engages the cylindrical interior surface portion 74 of the pulley 27, via a press-fit, for example, to form a rigid connection therebetween. A second annular radial bushing 112 is disposed between the inner surface 116 of the inner portion 96 of spring retainer 92 and the outer surface 88 of the sleeve portion 54 of the hub structure 52. Bushing 112 includes a flange 113 disposed at one end. Specifically, bushing 112 is press-fit to retainer 92 and is thus fixed to spring retainer 92. The second radial bushing 112 further supports the relative motion between the pulley 26 (via spring retainer 92) and the hub structure 52. The radial bushing 112 may be made of a material having a low coefficient of friction to facilitate sliding action between the spring retainer 92 and the hub 52. For example, the radial bushing 112 is preferably made from a steel material with teflon bonded on an inner surface thereof that engages sleeve 54. The material of the radial bushing 112 may also a metal, such as brass, or a lead-alloy. A lubricant may also be used at the interface between the second radial bushing 112 and inner portion 96 of the sleeve retainer 92 to facilitate sliding contact therebetween. The flange 113 is generally made of the same material as the bushing 112, and a lubricant may also be used at its interface with the hub structure 52, such that a low friction surface is provided for the hub structure 52 to contact should the pulley 26 move axially during operation, e.g., in the case of a pulley misalignment.

The pulley 26 is interconnected with the hub structure 52 by a generally helical spring 118 mounted within the annular space 86. The spring 118 is disposed in surrounding relation to the inner portion 96 of the spring retainer 92, and is radially separated from the main coils thereof by a clearance gap G1 when no torque is applied thereto (i.e., when at rest). While not shown, it can be appreciated by those skilled in the art that the spring 118 in the illustrated embodiment has one end bent axially outwardly, and this end extends within a notch formed in the radial portion 57 of the hub structure 52 in order to fit one end of spring 118 to the hub structure 52. The opposite end of the spring 118 is bent to extend axially inwardly, and this end is engaged within a notch formed in the wall portion 104 of the spring retainer 92. Alternatively, a spring without a bent end could be engaged by press fitting it into the radial portion 57 of the hub structure 52. Although a spring 118 is shown in the illustrated embodiment which has rectangular cross-sectioned volutes, a coil spring may also be used which has circular cross-sectional volutes.

Disposed between the spring 118 and the pulley 26 and adjacent the outer portion 100 of the spring retainer 92 is at least one spring sleeve 105. The sleeve is preferably not a complete cylindrical configuration, but is split so as to provide a "C"-shaped configuration allowing it to expand and contract radially. If one spring sleeve 105 is used, it may extend the entire length between the outer portion 100 and the end 61 of the axial portion 59 of the hub structure (a clearance gap is, of course, maintained between each end of the spring sleeve 105 and the spring retainer and axial portion 59), thus covering a majority of the volutes of the spring 118. Alternatively, the at least one spring sleeve 105 may include a plurality of spring sleeves 105 disposed adjacent to each other. The outer diameter surface 134 of the spring 118 and the inner diameter surface 135 of the sleeve 105 is such that a clearance gap G2 is formed therebetween when no torque is applied to the spring (when the system is at rest). Alternatively, the clearance gap G2 may exist between the spring sleeve 105 and the inner surface 86 of the pulley 26, depending on the particular fit of the spring sleeve 105 around the spring 118. The spring sleeve 105 is preferably made of a material having a low coefficient of friction to facilitate sliding contact of the spring 118 against the sleeve 105 when the spring expands into contact with sleeve 105. For example, the spring sleeve 105 is preferably a nylon material. The material of the spring sleeve 105 may also a metal, such as brass, or a lead-alloy. In FIG. 2, a spring slip ring 106 is also illustrated, disposed on a portion of the retainer 92 proximate to the hub end of the spring 118. The spring slip ring 106 has a "C"-shaped configuration similar to that of the spring sleeve 105 and performs essentially the same function as the spring sleeve 105 in a radially spring-constricting direction, providing a low-friction sliding-contact surface between the retainer 92 and the spring 118 when the spring 118 constricts against the retainer 92. The spring slip ring 106 may be made of the same material as the spring sleeve 105, and may or may not extend the entire length of the spring. Typically, if the spring slip ring 106 does not extend the full length of the spring 118, it is positioned proximate to the hub end of the spring, as the hub end is usually the first portion of the spring 118 to deflect under load.

The spring 118 may be installed within the annular space 86 in an axially compressed state, between radially extending walls 57 and 104. In order to support the spring 118 in this state, a spring support 125 is provided in the retainer 92, resting against retainer surface 104. The spring support is held in position by a tab that engages the same notch in the retainer 92 that is used to secure the spring 118. The spring support 125 is made of a low friction material such as nylon, and is contoured to follow the shape of the end surface of the installed, compressed spring 118. In general, the spring support 125 maintains parallel coil alignment of the spring 118 once it is installed.

The wall 57 is axially fixed, as the hub is fixed to shaft 36. The wall 104 of the retainer 92 receives the axial load, which in turn is transmitted to pulley 26 as a result of the fixed connection between pulley 26 and retainer 92. Thus, the retainer 92 and pulley 26 are biased towards the left in FIG. 2 under the force of spring 118. This has the effect of axially compressing the radial portion 128 of the annular bushing between pulley 26 (wall 71 thereof) and the hub structure 52 (wall 57 thereof).

The presence of this axial load is used as a source of torsional damping of the isolator device, which moderates the pulley 26 and hub structure 52 velocity differential caused by torsional inputs from the engine. The amount of torsional damping may be engineered by adjusting the axial spring rate of spring 118. The torsional damping is enabled to some degree as a result of the ability of the pulley to move slightly axially under the load of spring 118 through sliding engagement of the teflon coated surface of radial bushing 112 on hub sleeve 54. The press-fit insertion of spring retainer 92 against the surface portion 74 of the pulley 26 is the last step in the assembly of coupling assembly 29, and axially retains all components within the assembly 29.

The level of torsional damping is designed to increase with increasing application of torque. That is, as a positive torque is applied to the spring 118 as a result of the pulley 26 being driven by belt 20, inner diameter 130 of the spring 118 decreases, resulting in an increase in spring length. In other words, as the coils radially tighten towards the shaft axis as a result of the pulley 26 being driven, the coils are also caused to expand axially. This increase in length, in turn, causes an increase in the axial load reacting against the radial portion 128 of bushing 78, thus damping in movement between pulley 26 and hub 52. At the same time, as the torque increases, the diameter of the wire spring 118 decreases until the point where its inner diameter 130 contacts the outer surface 98 of the inner portion 96 of the spring retainer 92, which causes a sharp increase in spring rate of spring 118. This significantly limits further deflection of the spring in the radially inward and axially outward directions. For example, and not intended to be limiting, the spring rate of spring 118 has been shown to increase from about 0.4 Nm/deg prior to contacting the spring retainer 92 to more than 3 Nm/deg after contacting the spring retainer 92. The amount of radially inward deflection of the wire spring 118 can be varied by engineering the clearance gap G1 between the inner diameter 130 of the wire spring 118 and the spring retainer's 92 inner ring outer diameter 98. Though not intended to be limiting, the system may be engineered such that between about 25–35 degrees, (in one preferred example 30 degrees) of positive rotational movement of the pulley 26 relative to hub 52 is established (relative to the at-rest position) before contact is made by the spring 118 with the inner portion 96 of the spring retainer 92.

It will be understood by those skilled in the art during most dynamic operating conditions there are substantially very low loads on the spring 118, and the spring is generally not in contact with the inner portion 96 of the spring retainer or the spring sleeve 105. In general, the spring 118 is caused to contact the inner portion 96 of the spring retainer only during abrupt system changes such as during engine start-up. It is during such abrupt changes during start-up that the spring 118 would undergo the most torsional stress, for example in the aforementioned U.S. Pat. No. 5,139,463.

Of course, after this initial spring radial contraction, an opposite recoiling force will exist, as a result of the shaft acceleration momentarily exceeding that of the pulley, thus causing relatively significant expansion of the spring 118, until the outer diameter of the spring 118 contacts the inner surface 135 of spring sleeve 105, again such contact having the result of increasing the spring rate.

The amount of expansion is controlled by the clearance gap G2 between the outer diameter 134 of the spring 118 and the inner diameter 135 of the spring sleeve 105. Preferably, this reverse travel (i.e., negative, expansion direction) of the spring 118 is limited to be much less than that of the forward direction (i.e., positive, contraction direction) to reduce the stress in the spring 118 and improve component durability. For example, though not intended to be limiting, the spring may be sized such that 5–10 degrees of negative rotational movement of the pulley 26 relative to the hub 52 (with respect to the relative angular positions when the system is at rest) is achieved before sufficient spring expansion causes contact to be made with the spring sleeve 105. In the absence of this travel control (both in the positive and negative directions) the spring 118 could potentially be subject to large displacements which may result in fatigue of the spring.

Though not intended to be limiting, during an engine start-up, the spring may behave as follows. The wire spring 118 may contract and contact the inner portion 96 of the spring retainer 92, and then expand to contact the spring sleeve 105. The wire spring 118 may repeat the above motion at least once more before the applied torque in the spring diminishes and the spring 118 does not contact either the inner portion 96 or the spring sleeve 105 to achieve steady dynamic state.

The axial load in the spring 118 applied to portion 128 of bushing 78 also helps to slow the relative motion between the hub structure 52 and the pulley before spring 118 contact is made in either direction, which thus dissipates some energy as heat, rather than absorbing this energy in the spring 118.

Before the spring 118 deflection is limited in either direction by contacting the spring retainer 92 (in the positive direction) or spring sleeve 105 (in the negative direction), the clearance gaps G1 and G2 must first be taken-up by the spring. When the spring 118 contracts to contact the spring retainer 92, the spring 118 exhibits a significant increase in its spring rate. Likewise, a significant increase in spring rate is realized when the spring 118 expands so that the outer diameter 134 of the spring 118 contacts the sleeve 105. In this manner, a spring "soft stop" is created, as opposed to a solid contact between the pulley 26 and hub structure 52, when relative rotation therebetween reaches a predetermined level.

In the above embodiment, the pulley 26 is interconnected to the hub structure 52 by the coil spring 118, and spring retainer 92. When there is a positive torque transmitted by the belt 20 to the pulley 26, the rotational movement of the pulley 26 will be imparted to the hub structure 52 and, hence, the entire armature assembly 48 of the alternator, through the coil spring 118. During normal operation of the engine (i.e., after start-up), the resiliency of the coil spring 118 enables the alternator armature assembly 48 under these circumstances to have instantaneous rotational movements with respect to the pulley 26 so as to accommodate the high inertia characteristics of the alternator armature assembly 48. Similarly, where negative torques are imparted to the pulley 26 by the belt 20, instantaneous relative motion of the alternator armature assembly 48 with respect to the pulley 26 is accommodated so that any tendency for the belt 20 to slip with respect to the pulley 26 due to changes in torque in the belt 20 and the high inertia of the alternator armature assembly 48 are generally accommodated so as to minimize belt slippage.

For the purposes of this disclosure, the portion 96 of the spring retainer 92 between the spring 118 and hub 54 may be termed as an inner spring engaging structure, while the sleeve 105 may be termed on outer spring engaging structure.

It will be understood that the characteristics of the spring 118 are tuned to the particular drive system and more particularly to the particular characteristic of the engine of the drive system. The strength of the spring 118 is determined by diameter dimension of the steel utilized to form the coil. Proper tuning is determined by the spring rate which is a function of the number of turns or volutes included between the spring ends 121 and 123.

Although not shown in FIG. 2, it will be appreciated that a cap may be installed over the exposed end of the pulley 26 once the coupling assembly 29 has been installed to protect the internal components of the coupling assembly 29 from contamination. The cap may, for example, be comprised of an injection-molded plastic material.

Figure 4:
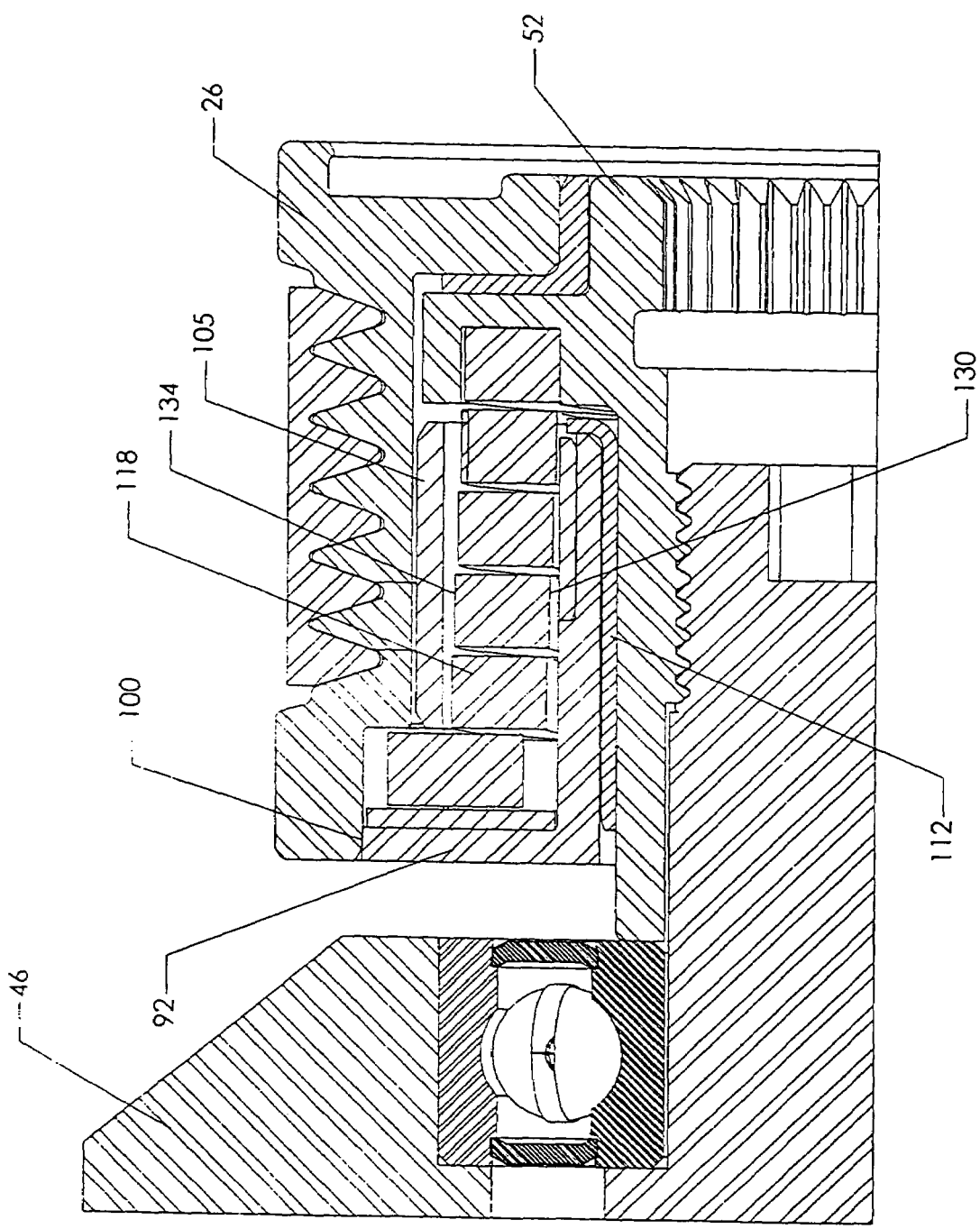
FIG. 4 is an enlarged fragmentary sectional view showing an alternate embodiment having a coil spring with varying diameter coils.

In an alternative embodiment, the spring 118 may be constructed such that each successive volute is decreasing in inner and outer diameter 130, 134 (shown in FIG. 4). With this configuration, as positive torque is applied to the spring, the spring 118 volutes contact the outer diameter of the inner portion 96 of the spring retainer 92 in successive manner, which results in a progressive rising rate in spring stiffness. Similarly, as negative torque is applied, the spring 118 volutes contact the inner cylindrical surface of the spring sleeve 105 in successive manner, causing a progressive rising rate in spring stiffness.

Figure 5:
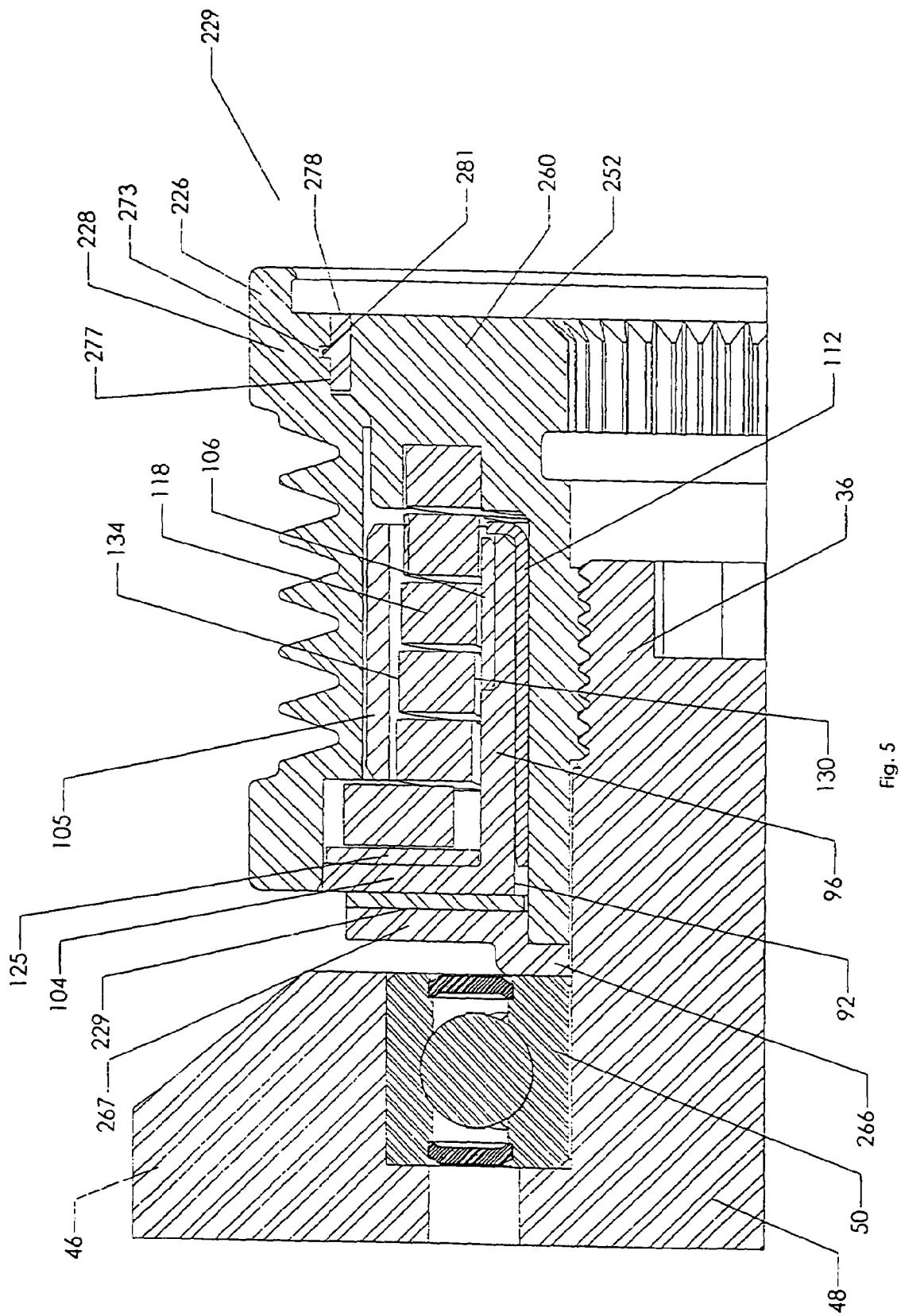
FIG. 5 is an enlarged fragmentary sectional view showing an alternate embodiment of the isolator device of the present invention.

FIG. 5 shows another embodiment of the decoupler, which is generally indicated as numeral 229. In this embodiment, the end 260 of the hub structure 252 radially extends for engagement with the corresponding end 228 of the pulley 226. An annular, radial bushing 278 may be disposed between the end 260 of the hub structure 252 and the end 228 of the pulley for facilitating sliding contact therebetween. The radial bushing 278 is of the same material as that described of bushing 78 in the previous embodiment, and a lubricant may be applied thereto. The bushing 278 may include a protruding tab 281 for engagement with an indentation 273 formed in the contact surface 277 of the pulley 226 for fixing the axial position of the radial bushing 278. It can be appreciated that the protruding tab 281 may be formed on an opposite side of the radial bushing 278 for engagement with an indentation (not shown) formed in the hub structure 252.

As seen in FIG. 5, the axial load of the spring 118 (which is installed as described above in the previous embodiment) is received by a thrust washer 229 on the opposite side of the spring 118, compared with the FIG. 2 embodiment] In this embodiment, a rigid spacer 266 and the thrust washer 229 are disposed between the decoupler 229 and the alternator assembly 46. As will be understood by those skilled in the art, a portion of the axial load of the spring 118 is also taken up by the hub structure 52 by the bearing contact of the pulley 226 via the radial bushing 278. An inner portion of the spacer 266 is axially squeezed between the hub 252 and the inner race of a ball bearing assembly 50 of the alternator assembly 46. The thrust washer 229 is disposed between the back side of connecting wall portion 104 and a flange portion 267 of the rigid spacer 266. The thrust washer 229 may be made of the same low coefficient of friction material as the annular bushing 78 of the previous embodiment, and the thrust washer supports relative motion between the shaft 36 and the pulley 226. Though the spring 118 in FIG. 5 is shown as having varying diameter coils, the diameter of the coils may be substantially the same, as with the first embodiment. The interaction between the spring 118 and other components of the decoupler 229 is the same as that described in the first embodiment.

Although the present discussion herein and throughout describes the decoupler 29 as being mounted to an alternator, it will be understood by those skilled in the art that the decoupler of the present invention can be mounted on any other similar device.

While the invention has been described with reference to the certain illustrated embodiments, the words which have been used herein are words of description, rather than words or limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed:

1. A decoupler, comprising:
   a hub structure capable of being mounted on a shaft;
   a pulley mounted on said hub structure and capable of relative rotational movement with respect to said hub structure;
   a coil spring extending between said pulley and said hub structure resiliently coupling said pulley with said hub structure, said coil spring transmitting driven rotational movements of said pulley to said hub structure; and
   an inner spring engaging structure rotatably mounted on said hub structure and rotationally fixed with respect to said pulley, said inner spring engaging structure engaging volutes of said coil spring as a result of radial contraction of said coil spring, wherein said hub structure has a radial portion frictionally engaging said pulley, whereby radial contraction and expansion of said spring urges said radial portion out of and into frictional engagement with said pulley, respectively, generating a proportional damping force moderating velocity differences between said hub structure and said pulley.

2. A decoupler according to claim 1, wherein said inner spring engaging structure comprises a radial wall portion connected to said pulley, and said radial wall portion being connected to said spring.

3. A decoupler according to claim 2, wherein said hub structure has a sleeve portion configured to extend over said shaft and said inner spring engaging structure is journal mounted on said sleeve portion by a bushing.

4. A decoupler according to claim 3, wherein said pulley is journal mounted on said hub structure by an annular bushing.

5. A decoupler according to claim 4, wherein said annular bushing has a radial portion extending between said radial portion of said hub structure and said pulley.

* * * * *